Figure 1:
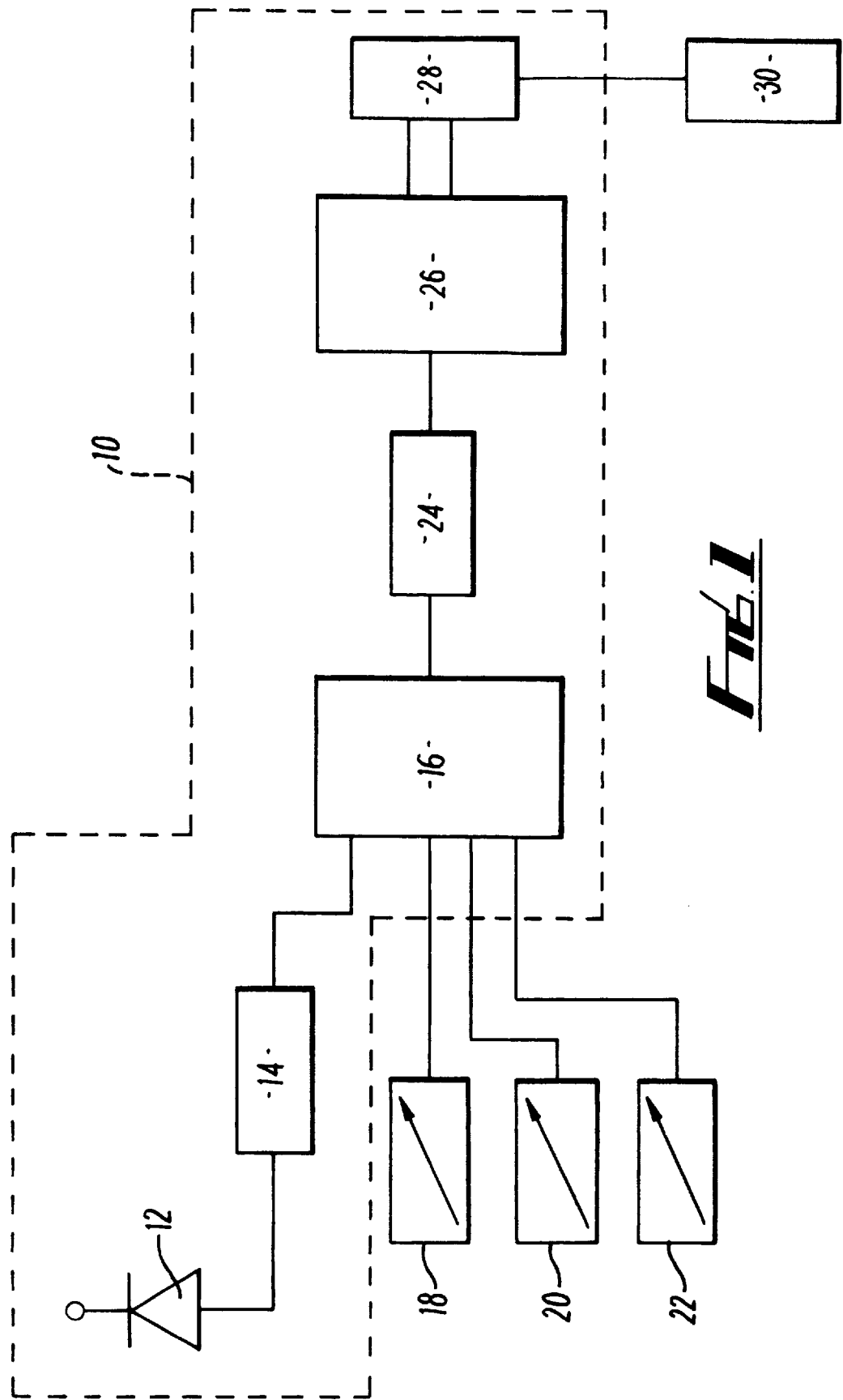

United States Patent
Dean

[11] Patent Number: 5,977,717
[45] Date of Patent: Nov. 2, 1999

[54] LOGIC LIGHTING CONTROL SYSTEM

[75] Inventor: Michael John Dean, Worcestershire, United Kingdom

[73] Assignee: Royce Thompson Limited, Birmingham, United Kingdom

[21] Appl. No.: 09/029,928

[22] PCT Filed: Sep. 6, 1996

[86] PCT No.: PCT/GB96/02193

§ 371 Date: May 20, 1998

§ 102(e) Date: May 20, 1998

[87] PCT Pub. No.: WO97/09868

PCT Pub. Date: Mar. 13, 1997

[30] Foreign Application Priority Data

Sep. 9, 1995 [GB] United Kingdom ................... 9518483

[51] Int. Cl.⁶ .................................................. H05B 37/02
[52] U.S. Cl. ........................ 315/156; 315/158; 250/205
[58] Field of Search .................................... 315/155, 156, 315/158; 250/205

[56] References Cited

U.S. PATENT DOCUMENTS 3,965,388  6/1976  Brisk ........................................ 315/155
4,697,122  9/1987  Hoffer ...................................... 315/158

FOREIGN PATENT DOCUMENTS 0563696  10/1993  European Pat. Off. .
2577742   8/1986  France .
91/11088  7/1991  WIPO .

*Primary Examiner*—Michael B Shingleton
*Attorney, Agent, or Firm*—Ratner & Prestia

[57] ABSTRACT

A lighting control system comprises a photosensor (12), a comparative circuit (16) and a logic switching circuit (26). The photosensor (12) produces an output (VP) which is a function of the light intensity level, and the comparative circuit (16) compares the output (VP) from the photosensor (12) with a number of preset levels (V1 to V6) in order to produce a logic output which controls the switching of the logic switching circuit (26) between four states: daylight (32), dusk (34), night (36) and dawn (38). At dusk, when the light intensity falls below a predetermined value (L2) the light is switched on. If the light intensity level then improves the light will not, however, switch off again until the light intensity rises above another higher predetermined level (L6). Similarly at dawn, the light will switch off when the light intensity rises above a predetermined value (L4) and then only switch on again if the light intensity falls below a different, lower predetermined value (L5). The problem of repeated switching on and off as a result of trasient light intensity variations at dusk and dawn is consequently avoided, without the need to introduce significant delays.

14 Claims, 2 Drawing Sheets

LOGIC LIGHTING CONTROL SYSTEM

The present invention relates to lighting control systems and in particular lighting control systems utilising photoelectric means to sense light intensity levels, such as are used to control street lighting automatically.

With conventional lighting control systems which use photoelectric control, a photoelectric sensor is used which is separate from the switching circuit.

With conventional street lighting systems using photoelectric control, the lights are normally set to switch on at dusk when the light intensity falls below a first predetermined value and switch off at dawn when the light intensity rises above a second predetermined value. Because the street lights take time to reach full intensity, the first predetermined value is normally greater than the second predetermined value.

If at dusk, after the lights have switched on, the light intensity level rises again above the first predetermined value, the lights will switch off and similarly at dawn, if after the lights have switched off, the light intensity level falls again below the second predetermined value, the lights will switch on again. As a consequence, the system is sensitive to transient light intensity variations which would cause the lights to repeatedly switch on and off as dusk and dawn approach.

In order to overcome this problem, switching of the system is subject to significant time delays, for example of the order of 15 to 30 seconds, so that at dusk the lights will not switch on until the light intensity has remained at or below the first predetermined level for the delay period, and at dawn the lights will not switch off until the light intensity has remained at or above the second predetermined level for the delay period.

This system has the drawback that the switching on of the lights is delayed for a significant period during which light levels may deteriorate substantially. This then affects the accuracy of the control.

According to one aspect of the present invention a lighting control system comprises a photosensor, comparator means and a logic switching circuit, wherein the photosensor produces an output which is a function of the light intensity level, the comparator means being adapted to compare the output from the photosensor with a plurality of preset levels and to produce a logic output which controls the switching of the logic switching circuit between a plurality of states.

Preferably the lighting control system is in the form of an integrated circuit.

According to a preferred embodiment of the invention the light falling upon the photosensor is filtered to provide a response from the photosensor which is close to the human eye.

According to a further aspect of the present invention the logic switching circuit has four states; the logic switching circuit being in a first state when the light intensity is above a first predetermined value;

the logic switching circuit going from its first state to a second state when the light intensity falls below a second predetermined value;

the logic switching circuit going from its second state to a third state when the light intensity falls below a third predetermined value;

the logic switching circuit going from its third state to a fourth state when the light intensity rises above a fourth predetermined value;

the logic switching circuit going from its fourth state to its third state when the light intensity falls below a fifth predetermined value;

the logic switching circuit going from its second state to its first state when the light intensity rises above a sixth predetermined value;

the fifth predetermined value being below the fourth predetermined value and the sixth predetermined value being above the second predetermined value.

Switching means is preferably provided for switching the lighting system on when the logic switching circuit is in its second and third states and switching the lighting system off when the logic switching circuit is in its first and fourth states.

With the above system, the first state of the logic switching circuit corresponds to normal daylight, the second state to dusk, the third state to night and the fourth state to dawn. At dusk, when the light intensity falls below the second predetermined value the light is switched on. If the light intensity level improves the light will not, however, switch off again until the light intensity rises above the sixth predetermined level. Similarly at dawn, the light will switch off when the light intensity rises above a fourth predetermined value and then only switch on again if the light intensity falls below the fifth predetermined value. The problem with transient light intensity variations is consequently avoided without the need to introduce significant delays. A short delay may be incorporated into the control system in order to prevent the logic switching circuit changing state prematurely with transient variations in light intensity. However, as the sensitivity of the control system to transient variations in light intensity at dusk and dawn is very much reduced, much shorter time delays may be used, thereby avoiding the problems of the conventional control systems.

According to a preferred embodiment of the invention, the sixth predetermined value may be equal to the first predetermined value and the fifth predetermined value is intermediate of the third and fourth predetermined values. The second predetermined value is also preferably higher than the fourth predetermined value.

Further embodiments of the invention are defined in the dependent claims.

Figure 2:
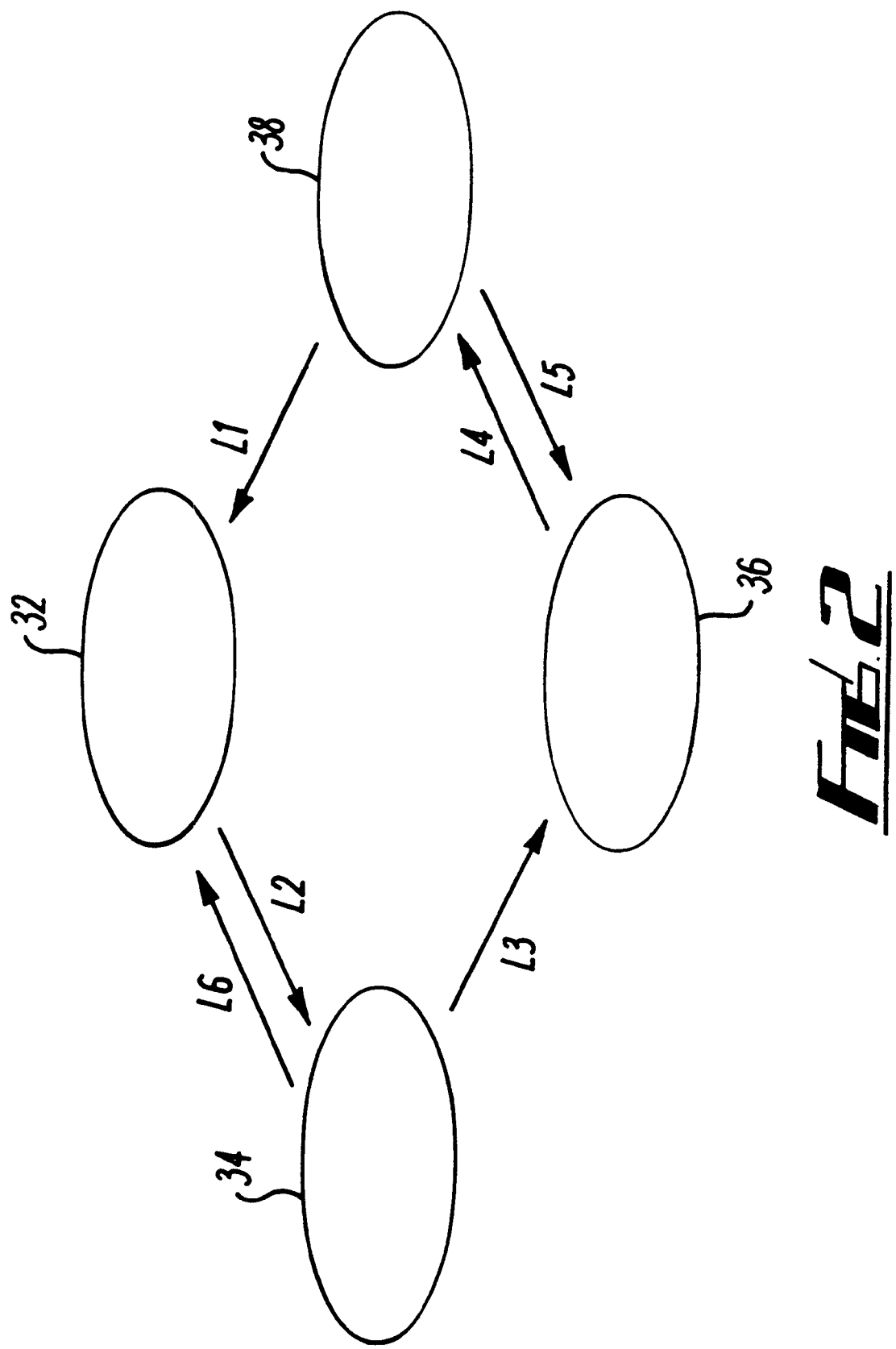

An embodiment of the invention is now described, by way of example only, with reference to the accompanying drawings, in which:

FIG. 1 is a diagram of a lighting control system in accordance with the present invention; and FIG. 2 is a logic diagram of the lighting control system illustrated in FIG. 1.

FIG. 1 illustrates an integrated circuit 10 for controlling the switching of a street lighting system in accordance with the light intensity level sensed by a silicon photosensor 12. The photosensor 12 senses the amount of daylight and produces a voltage which is a function of the light intensity level.

The voltage from the silicon photosensor 12 is amplified by amplifier 14 and is fed to a comparative circuit where it is compared to voltages corresponding to five predetermined light intensity levels;

voltage V1 corresponding to a first predetermined light intensity level L1 which represents normal daylight;

voltage V2 corresponding to a second predetermined light intensity level L2 at which it is desired to switch the lighting system on at dusk;

voltage V3 corresponding to a third predetermined light intensity level L3 which represents night;

voltage V4 corresponding to a fourth predetermined light intensity level L4 at which it is desired to switch the lighting system off at dawn; and voltage V5 corresponding to a fifth predetermined light intensity level L5 which is intermediate of the third and fourth levels.

Three further inputs 18, 20 and 22 are provided to the comparator 16; input 18 being connected to adjustable means by which the voltage V2 may be set to a required value; input 20 being connected to adjustable means by which the voltage V4 may be set to a required value; and input 22 being connected to adjustable means by which the voltages V1, V3 and V5 may be set to required values. The voltages V1, V3 and V5 are interrelated so that they may be increased or decreased using the input 22.

The comparator 16 compares the voltage VP from the photoelectric detector 12, with the voltages V1 and V5 and produces a coded logic output, when the light intensity produces a voltage VP which corresponds to one of the set voltages V1 to V5.

The logic output from comparator 16 is passed via a low pass filter 24 to a logic switching circuit 26. The low pass filter 24 introduces a time delay of five seconds on switching on and ten seconds on switching off.

The logic switching circuit 26 has four states corresponding to normal daylight, dusk, night and dawn. When the light intensity measured by the photosensor 12 rises to a level L1 corresponding to voltage V1, and remains at the level or above for more than 10 seconds, the logic signal from the comparator 16 will switch the logic switching circuit 26 to the daylight state 32. If the light intensity measured by the photosensor 12, falls to a level L2 corresponding to voltage V2 or below, and remains at that level or below for more than five seconds, the logic switching circuit 26 will be switched to the dusk state 34. If the light intensity level continues to deteriorate and falls to a level L3 corresponding to voltage V3 or below and remains there for more than five seconds, the logic switching circuit 26 will go to the night state 36. If however while the logic switching circuit 26 is in the dusk state, the light improves to an intensity level L1 corresponding to voltage V1 or greater and remains at that level for ten seconds, the logic switching circuit 26 will be switched back to the daylight state 32. Once the logic switching circuit 26 is in the night state, if the light improves to an intensity level L4 corresponding to voltage V4 and remains at that level for ten seconds, the logic switching circuit 26 will go to the dawn state 38. Further improvements in the light to an intensity level L1 corresponding to voltage V1 which remains at that level for 10 seconds, will then switch the logic switching circuit 26 back to the daytime state 32. If however while the logic switching circuit 26 is in the dawn state, the light deteriorates to an intensity level L5 corresponding to voltage V5 or below and remains at that level for a period in excess of five seconds, the logic switching circuit 26 will be switched back to the night state 36.

The logic switching circuit 26 produces a pair of outputs which will control the switching on and switching off of the lighting system 30, through a driving circuit 28, so that when the logic switching circuit 26 is in the daytime and dawn states, the lighting system will be switched off and when the logic switching circuit 26 is in the dusk and night states, the lighting system 30 will be switched on. The driving circuit 28 comprises a relay and triac. The relay is controlled by the first output from the logic circuit 26, the second output from the logic switching circuit 26 switching the triac, so that the power may be fed through the relay or triac to the lighting system 30. The logic switching circuit 26 controls the first and second power outputs so that when switching on the lighting system 30 the second output will operate before the first output and when switching off the lighting system 30, the first output will be disabled before the second output.

As illustrated by the logic diagram in FIG. 2, when the light levels are above a first predetermined value for example 200 lux, the logic switching circuit 26 will be in the daylight state and the lighting system 30 will be switched off. When the light level falls to a second predetermined intensity level, for example 70 lux, and remains at or below the level for five seconds, the logic switching circuit 26 goes to the dusk state and the lighting system 30 is switched on. If the light continues to deteriorate and reaches a third predetermined value, for example 2 lux, and remains at that level or below for five seconds, the logic switching circuit 26 goes to the night state. If however, before reaching the third predetermined level, the light intensity improves and reaches the first predetermined level (200 lux) and remains at that level for ten seconds, the logic switching circuit 26 switches back to the daylight state and the lighting system is switched off. When the switching state logic circuit is in the night state, when the light intensity reached a fourth predetermined level, for example, 35 lux and remains at that level for ten seconds, the logic switching circuit 26 goes to the dawn state and the lighting system 30 is switched off. Continued improvement in the light intensity level back to the first predetermined level (200 lux) will then switch the logic switching circuit 26 back to the daylight state. If however before reaching the first predetermined level, the light intensity deteriorates to below a fifth predetermined intensity level, for example 17 lux, and remains at that level for five seconds, the logic switching circuit 26 returns to its night mode and the lighting system 30 is switched back on.

Various modifications may be made without departing from the invention. For example, while in the embodiment described above, voltages V1, V3 and V5 are interlinked and controlled together, each of the voltages may alternatively be controlled separately or in any other appropriate grouping. While in the above embodiment, when the logic switching circuit 26 is in the dusk state 34, the lights will be switched back off if the light intensity improves to the first predetermined value L1, switching back on of the light may alternatively be controlled at a sixth predetermined value L6 which is intermediate of the first and second predetermined values L1 and L2. In this case a sixth voltage V6, corresponding to the sixth predetermined light intensity level L6, may be set to the required value by adjustable means connected to the inputs 18, 20, 22 which are provided to the comparator 16.

The low pass filter 24 of the circuit described above is preferably adjustable so that the delay may be varied between zero and 30 seconds on switching on and zero and 60 seconds on switching off. While in the above embodiment the time delay on switching off is twice that on switching on, any desired relationship between these times may be used.

While it may be desirable in certain circumstances to use longer time delays, generally time delays significantly shorter than those used in lighting systems hitherto will be used thus overcoming the problem of control systems used hitherto.

I claim:

1. A lighting control system comprising a photosensor, comparator means and a logic switching circuit, the photosensor producing an output which is a function of the light intensity level, the comparator means being adapted to compare the output from the photosensor with a plurality of preset levels and to produce a logic output which controls the switching of the logic switching circuit between a plurality of states, wherein the logic switching circuit has four states;

the logic switching circuit being in a first state when the light intensity is above a first predetermined value;

the logic switching circuit going from its first state to a second state when the light intensity falls below a second predetermined value;

the logic switching circuit going from its second state to a third state when the light intensity falls below a third predetermined value;

the logic switching circuit going from its third state to a fourth state when the light intensity rises above a fourth predetermined value;

the logic switching circuit going from its fourth state to its third state when the light intensity falls below a fifth predetermined value;

the logic switching circuit going from its second state to its first state when the light intensity rises above a sixth predetermined value;

the fifth predetermined value being below the fourth predetermined value and the sixth predetermined value being above the second predetermined value.

2. A method of controlling lighting using a photosensor and a logic switching circuit, the photosensor producing an output which is a function of the light intensity level, the output being compared with a plurality of preset levels to produce a logic output which controls the switching of the logic switching circuit between a plurality of states, wherein the logic switching circuit has four states;

the logic switching circuit being in a first state when the light intensity is above a first predetermined value;

the logic switching circuit going from its first state to a second state when the light intensity falls below a second predetermined value;

the logic switching circuit going from its second state to a third state when the light intensity falls below a third predetermined value;

the logic switching circuit going from its third state to a fourth state when the light intensity rises above a fourth predetermined value;

the logic switching circuit going from its fourth state to its third state when the light intensity falls below a fifth predetermined value;

the logic switching circuit going from its second state to its first state when the light intensity rises above a sixth predetermined value;

the fifth predetermined value being below the fourth predetermined value and the sixth predetermined value being above the second predetermined value.

3. A lighting control system according to claim 1, wherein the photosensor, comparator means and logic switching circuit form part of an integrated circuit.

4. A lighting control system according to claim 1, further comprising a light filtering means coupled with the photosensor, such that light falling upon the photosensor is filtered to provide a response to light intensity from the photosensor which is close to the response of the human eye.

5. A lighting control system according to claim 1, further comprising a lighting switching means adapted to switch the lighting on when the logic switching circuit is in its second and third states and to switch the lighting off when the logic switching circuit is in its first and fourth states.

6. A lighting control system according to claim 1, further comprising a time delay means which introduces a predetermined time delay between the logic output from the comparator means indicative that the light intensity has fallen below or risen above a predetermined value and the switching of the logic switching circuit between states.

7. A lighting control system according to claim 6, wherein the predetermined time delay is less than 60 seconds, preferably less than 30 seconds and most preferably less than 15 seconds.

8. A lighting control system according to claim 6, wherein the predetermined time delay is greater when switching to the first or fourth states than when switching to the second or third states, preferably by a factor of two.

9. A lighting control system according to claim 6, wherein the predetermined time delay when switching to the first or fourth states is approximately 10 seconds and when switching to the second or third states is approximately 5 seconds.

10. A lighting control system according to claim 1, wherein the sixth predetermined value is equal to the first predetermined value.

11. A lighting control system according to claim 1, wherein the fifth predetermined value is intermediate of the third and fourth predetermined values.

12. A lighting control system according to claim 1, wherein the second predetermined value is higher than the fourth predetermined value.

13. A lighting control system according to claim 1, further comprising adjustment means whereby one or more predetermined output levels, corresponding to one or more predetermined values of light intensity, may be set to a required value.

14. A lighting control system according to claim 6, further comprising time delay adjustment means whereby the predetermined time delay may be set to a required value.

* * * * *